United States Patent
Tsujii

(10) Patent No.: US 8,922,826 B2
(45) Date of Patent: Dec. 30, 2014

(54) INFORMATION PROCESSING APPARATUS, METHOD OF CONTROLLING THE SAME, AND STORAGE MEDIUM

(71) Applicant: Canon Kabushiki Kaisha, Tokyo (JP)

(72) Inventor: Hiroto Tsujii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/777,536

(22) Filed: Feb. 26, 2013

(65) Prior Publication Data

US 2013/0258357 A1    Oct. 3, 2013

(30) Foreign Application Priority Data

Mar. 29, 2012   (JP) ................ 2012-077802

(51) Int. Cl.
*G06F 3/12* (2006.01)
(52) U.S. Cl.
CPC ............ *G06F 3/1292* (2013.01); *G06F 3/1225* (2013.01); *G06F 3/1204* (2013.01)
USPC ............ 358/1.6; 358/1.15; 709/219; 709/229
(58) Field of Classification Search
None
See application file for complete search history.

(56) References Cited

U.S. PATENT DOCUMENTS

| | | | |
|---|---|---|---|
| 6,963,424 B1 | 11/2005 | Higuchi | |
| 2004/0137919 A1* | 7/2004 | Biundo | 455/466 |
| 2005/0060649 A1* | 3/2005 | Kimura et al. | 715/526 |
| 2006/0215212 A1 | 9/2006 | Tao | |
| 2008/0068646 A1* | 3/2008 | Kobayashi | 358/1.15 |
| 2009/0128852 A1* | 5/2009 | Fujishita | 358/1.15 |
| 2012/0050784 A1 | 3/2012 | Kawaura | |
| 2013/0215465 A1 | 8/2013 | Mutsuno et al. | |

FOREIGN PATENT DOCUMENTS

| | | |
|---|---|---|
| JP | 2001-312392 A | 11/2001 |
| JP | 2004-220606 A | 8/2004 |

OTHER PUBLICATIONS

U.S. Appl. No. 13/785,898, filed Mar. 5, 2013. Inventor: Kensuke Kawajiri.
Notice of Allowance dated May 23, 2014 in U.S. Appl. No. 13/785,898.

* cited by examiner

*Primary Examiner* — Mark Zimmerman
*Assistant Examiner* — Richa Mishra
(74) *Attorney, Agent, or Firm* — Fitzpatrick, Cella, Harper & Scinto

(57) ABSTRACT

An information processing apparatus (printing server) of one aspect of the present invention generates print data from the print target file attached to the electronic mail received from a mobile terminal via a network, and causes the printer designated in the electronic mail to execute printing based on the print data. Upon receiving such electronic mail, the print server saves the electronic mail address of the transmission source of the electronic mail. In addition, when the installation state of a print driver changes, the print server notifies a mobile terminal corresponding to the saved electronic mail address of information indicating the change by using the saved electronic mail address.

7 Claims, 10 Drawing Sheets

FIG. 8

| No. | EXTENSION | FILE TYPE | APPLICATION NAME |
|---|---|---|---|
| 1 | pdf | PDF DOCUMENT | pdf SOFTWARE |
| 2 | jpg | IMAGE | jpg SOFTWARE |
| 3 | htm, html | HTML DOCUMENT | HTML SOFTWARE |
| 4 | txt | TEXT DOCUMENT | TEXT EDITING SOFTWARE |

FIG. 9

| PRINTER DRIVER | PRINTER NAME |
|---|---|
| LBP100 | 100 |
| LBP200 | 200 |
| LBP300 | 300 |
| ⋮ | ⋮ |
| LBP800 | 800 |
| LBP900 | 900 |

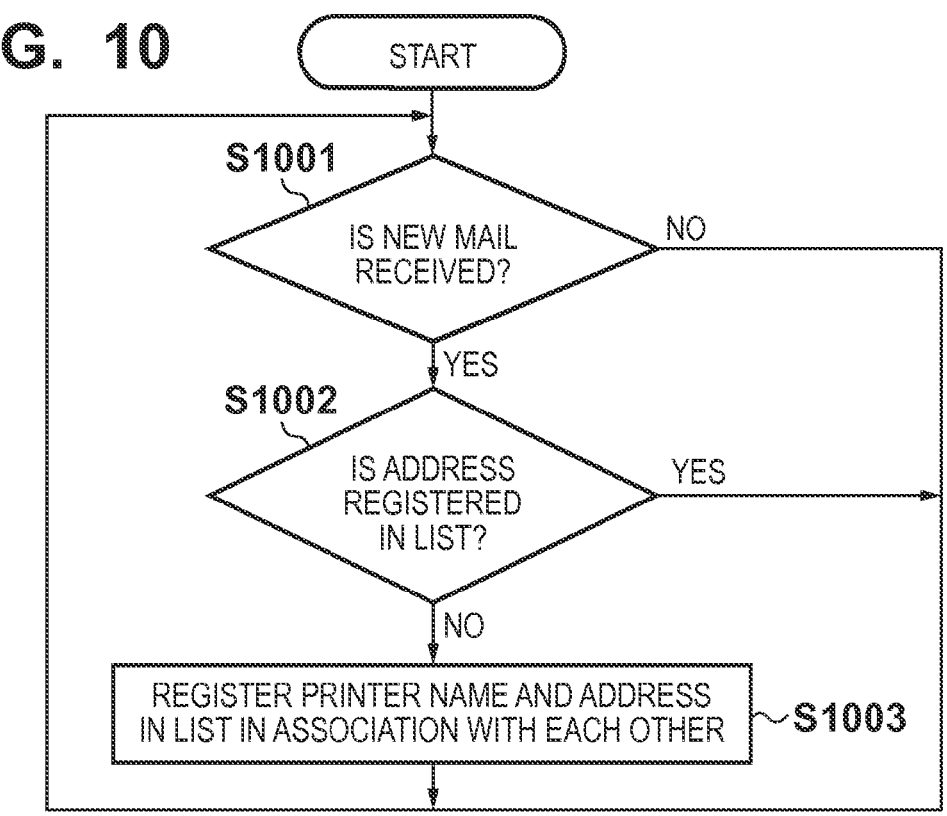

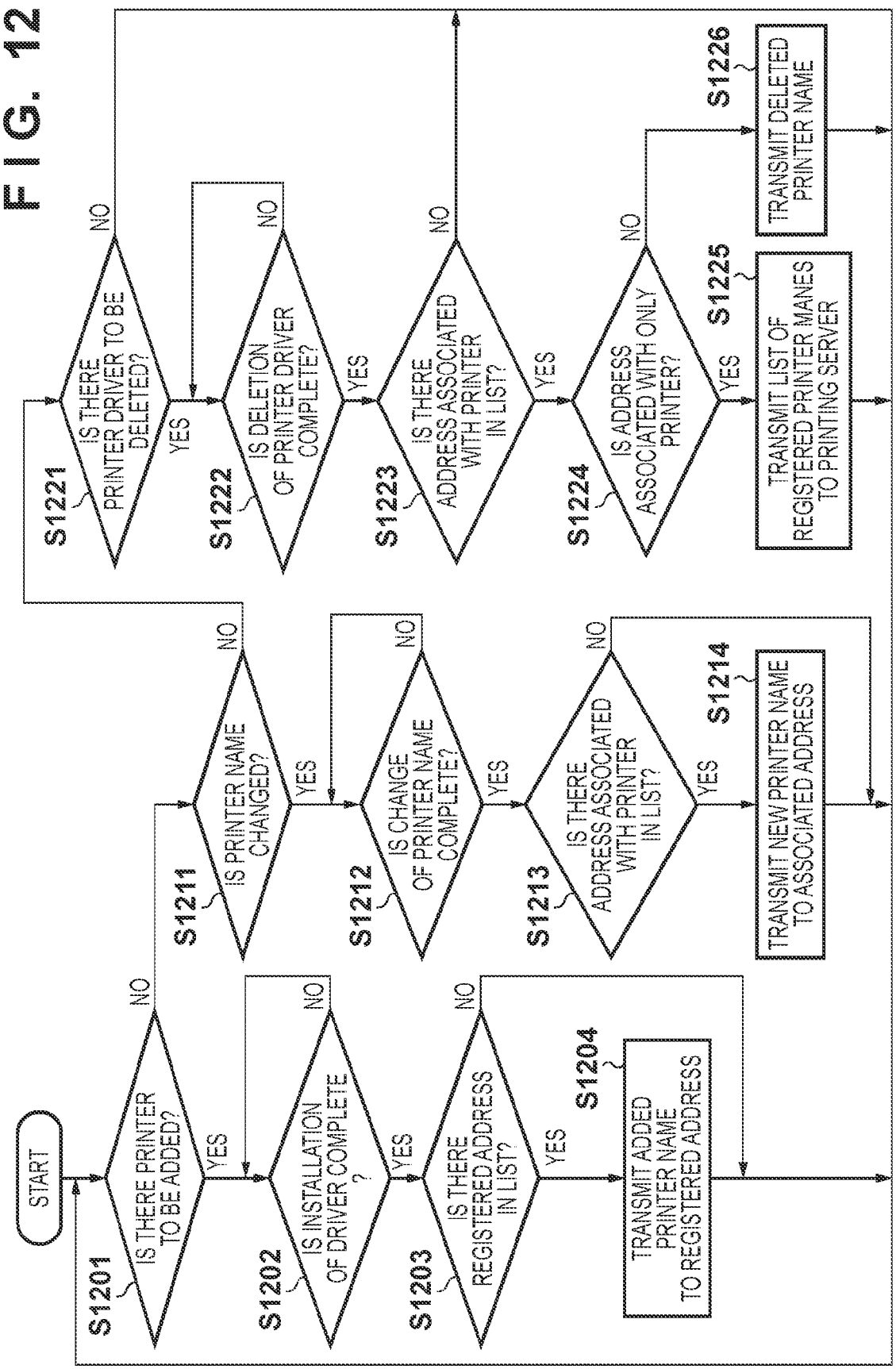

INFORMATION PROCESSING APPARATUS, METHOD OF CONTROLLING THE SAME, AND STORAGE MEDIUM

BACKGROUND OF THE INVENTION

1. Field of the Invention

The present invention relates to an information processing apparatus for printing by using electronic mail, a method of controlling the same, and a storage medium.

2. Description of the Related Art

There is available a printing system which allows a printing apparatus (printer) connected on a network to directly execute printing from a mobile terminal such as a cellular phone without the intervention of a PC (Personal Computer) or the like. In such a printing system, in general, a mobile terminal transmits a print target file to a printer upon attaching the file to print target electronic mail to cause the printer to execute printing based on the file. In this case, the mobile terminal transmits electronic mail attached with a print target file to an electronic mail address, as a destination, which corresponds to a printer to execute printing. The printer receives the electronic mail from a mail server and executes printing based on the received electronic mail and the file attached to the electronic mail.

Japanese Patent Laid-Open No. 2004-220606 discloses a system in which a cellular phone transmits electronic mail and its attached file to a specific server on a network, and the server generates print data from the data received from the cellular phone and causes a designated printer to print the data. This system designates a printer based on the electronic mail address assigned to the printer. In addition, in the system disclosed in Japanese Patent Laid-Open No. 2004-220606, when the mail server notifies a mobile terminal that electronic mail addressed to the mobile terminal is stored, the mobile terminal can instruct a specific printer to print the electronic mail and its attached file. This allows the mobile terminal to make the printer print long electronic mail whose browsing may be limited due to too large a display screen size or the like or an attached file whose browsing may be limited due to inability to execute an application program.

In addition, Japanese Patent Laid-Open No. 2001-312392 discloses a printing system in which a mobile terminal such as a cellular phone or PDA makes a printer print electronic mail and its attached file via an application server. In this printing system, a printer is connected to a network via a dedicated adapter directly connected to the printer. This printer functions as an interface between the application server and the printer and transmits the print data received from the application server to the printer, thereby causing the printer to print the print data.

In a printing system like that disclosed in Japanese Patent Laid-Open Nos. 2004-220606 and 2001-312392, in general, a printer driver (print driver) for operating a printer is installed in a server in advance. In addition, an application program for generating print data (print job) from the electronic mail and its attached file received from a mobile terminal or the like is also installed in the server in advance. If the server is formed from, for example, a PC, it is possible to display a screen associated with the operation or state of the printer on the display unit of the PC via the printer driver and the application program.

The conventional technique described above has the following problem. In the above printing system using electronic mail, when the installation state of a printer driver (print driver) has changed in the server, the user of the mobile terminal cannot know the change. Assume that a new print driver is installed in the server, a printer name corresponding to a print driver installed in the server is changed, or a print driver is deleted. In this case, the user of the mobile terminal cannot know the change.

SUMMARY OF THE INVENTION

The present invention has been made in consideration of the above problem. The present invention provides a technique of, when the installation state of a print driver has changed in an information processing apparatus which makes a printer execute printing based on the electronic mail received from a mobile terminal, notifying the proper mobile terminal of information indicating the change.

According to one aspect of the present invention, there is provided an information processing apparatus in which print drivers respectively corresponding to not less than one printing apparatus configured to communicate via a network are installed, the apparatus comprising: a reception unit configured to receive, from a mobile terminal, electronic mail to which a print target file is attached and in which a printing apparatus to print the file is designated; a print control unit configured to generate print data from the print target file attached to the electronic mail received by the reception unit by using a print driver corresponding to a printing apparatus designated in the electronic mail, and cause the designated printing apparatus to execute printing based on the generated print data; a saving unit configured to save an electronic mail address of a transmission source of electronic mail received by the reception unit; and a notification unit configured to, when an installation state of a print driver in the information processing apparatus changes, notify a mobile terminal corresponding to an electronic mail address saved by the saving unit of information indicating the change by using the electronic mail address.

According to another aspect of the present invention, there is provided a method of controlling an information processing apparatus in which print drivers respectively corresponding to not less than one printing apparatus configured to communicate via a network are installed, the method comprising: receiving, from a mobile terminal, electronic mail to which a print target file is attached and in which a printing apparatus to print the file is designated; generating print data from the print target file attached to the electronic mail by using a print driver corresponding to a printing apparatus designated in the electronic mail received in the receiving, and causing the designated printing apparatus to execute printing based on the generated print data; saving an electronic mail address of a transmission source of electronic mail received in the receiving; and when an installation state of a print driver in the information processing apparatus changes, notifying a mobile terminal corresponding to the saved electronic mail address of information indicating the change by using the saved electronic mail address.

The present invention can provide a technique of, when the installation state of a print driver has changed in an information processing apparatus which makes a printer execute printing based on the electronic mail received from a mobile terminal, notifying the proper mobile terminal of information indicating the change.

Further features of the present invention will become apparent from the following description of exemplary embodiments (with reference to the attached drawings).

BRIEF DESCRIPTION OF THE DRAWINGS

FIG. 8 is a view showing an example of a table associating extensions with applications according to the embodiment of the present invention;

FIG. 9 is a view showing an example of a table associating printer drivers with printer names according to the embodiment of the present invention;

FIG. 10 is a flowchart showing a procedure for electronic mail address registration processing which is executed in response to the reception of electronic mail from a mobile terminal 101 via the mail server 103 in the printing server 104 according to the embodiment of the present invention;

FIG. 11 is a view sowing an example of a list in which printer names and electronic mail addresses are registered in association with each other according to the embodiment of the present invention; and FIG. 12 is a flowchart showing a procedure for notifying the mobile terminal 101 of information indicating a change in the installation state of a printer driver in the printing server 104 according to the embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Arrangement of Printing System 100>

Figure 1:
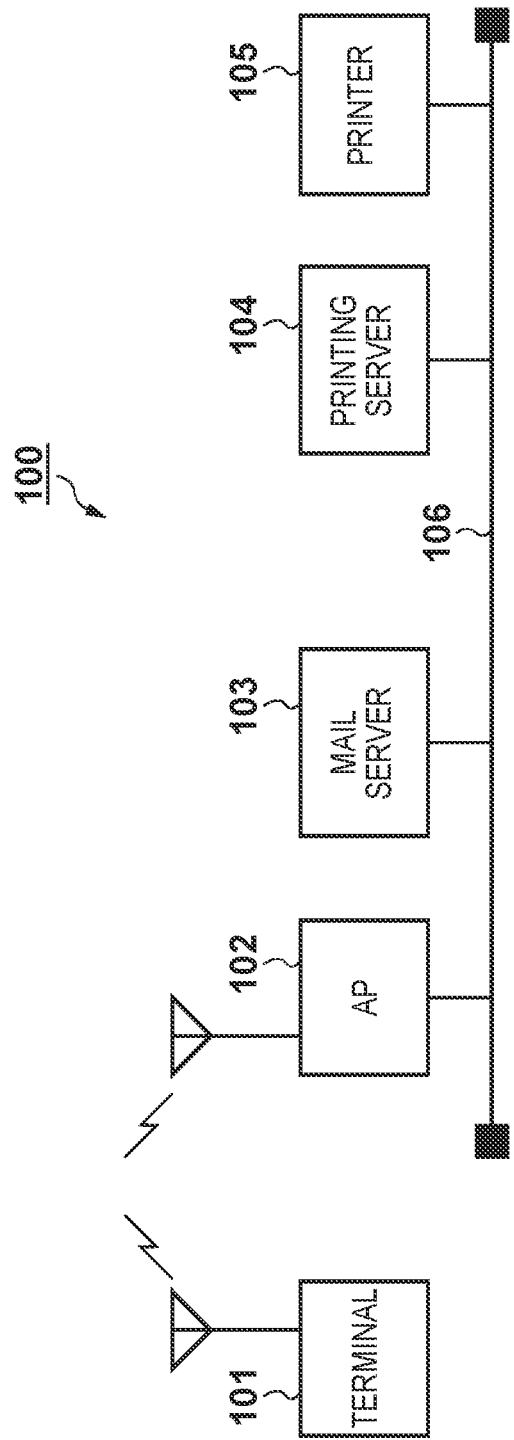
FIG. 1 is view schematically showing an example of the arrangement of a printing system 100 according to an embodiment of the present invention.

FIG. 1 is a view schematically showing an example of the arrangement of a printing system 100 according to an embodiment of the present invention. As shown in FIG. 1, the printing system 100 includes a mobile terminal 101, an AP (Access Point) 102, a mail server 103, a printing server 104, and a printer 105. The AP 102, the mail server 103, the printing server 104, and the printer 105 are mutually connected to each other via a wired LAN (Local Areal Network) 106 so as to be communicable with each other. The wired LAN 106 is formed from Ethernet®. In this embodiment, the printer 105 is an example of a printing apparatus, and the printing server 104 is an example of an information processing apparatus which can communicate with the printing apparatus via a network. Although FIG. 1 shows only one printer (printer 105), a plurality of printers may be connected to the wired LAN 106.

The mobile terminal 101 is an information terminal such as a cellular phone or smart phone having a size that allows to carry it with a hand, and can make various kinds of application programs run on the installed OS (Operating System). For example, an application program (that is, electronic mail software) for transmitting/receiving electronic mail via wireless communication is installed in the mobile terminal 101. The user of the mobile terminal 101 can instruct the printer to print electronic mail and its attached file by using this electronic mail software via a network.

The AP 102 is a device functioning as a bridge for connecting the mobile terminal 101 to a wired network via wireless communication. The AP 102 may be an access point complying with a wireless LAN scheme such as IEEE802.11a/b/g. In this case, the mobile terminal 101 can access the wired LAN 106 via the AP 102 and can also access the devices connected to the wired LAN 106.

The mail server 103 functions as an SMTP server and a POP server. The mail server 103 transmits and receives electronic mail (E-mail) to and from external apparatuses (for example, the mobile terminal 101) in accordance with SMTP and POP. The mail server 103 is formed as a general information processing apparatus such as a PC, in which a program for implementing a function as a mail server (SMTP server or POP sever) is installed and runs. In this embodiment, for example, the mail server 103 receives and holds the electronic mail transmitted from the mobile terminal 101 and addressed to an electronic mail address corresponding to the mail server 103.

A printer driver (print driver) corresponding to the printer 105 connected to the wired LAN 106 is installed in the printing server 104, and controls the operation of the printer 105 via the printer driver. If printers other than the printer 105 are connected to the wired LAN 106, printer drivers corresponding to these printers are also installed in the printing server 104.

As will be described later, the printing server 104 analyzes the electronic mail and its attached file received from the mobile terminal 101 via the mail server 103 to generate print data which can be printed by the printer designated in the electronic mail. An application program (printing application) for performing such analysis is installed in the printing server 104. The printing server 104 also transmits the generated print data to the designated printer and instructs (commands) the printer to execute printing based on the print data by using the printer driver. The printing server 104 is also formed as a general information processing apparatus such as a PC like the mail server 103, in which a program for implementing a function as a printing server is installed and runs.

The printing server 104 controls the printer 105 based on a printer driver and an application program which operate in the printing server 104. The printer 105 prints an image based on the print data received from the printing server 104 on a sheet in accordance with a print instruction from the printing server 104.

<Arrangement of AP 102>

Figure 2:
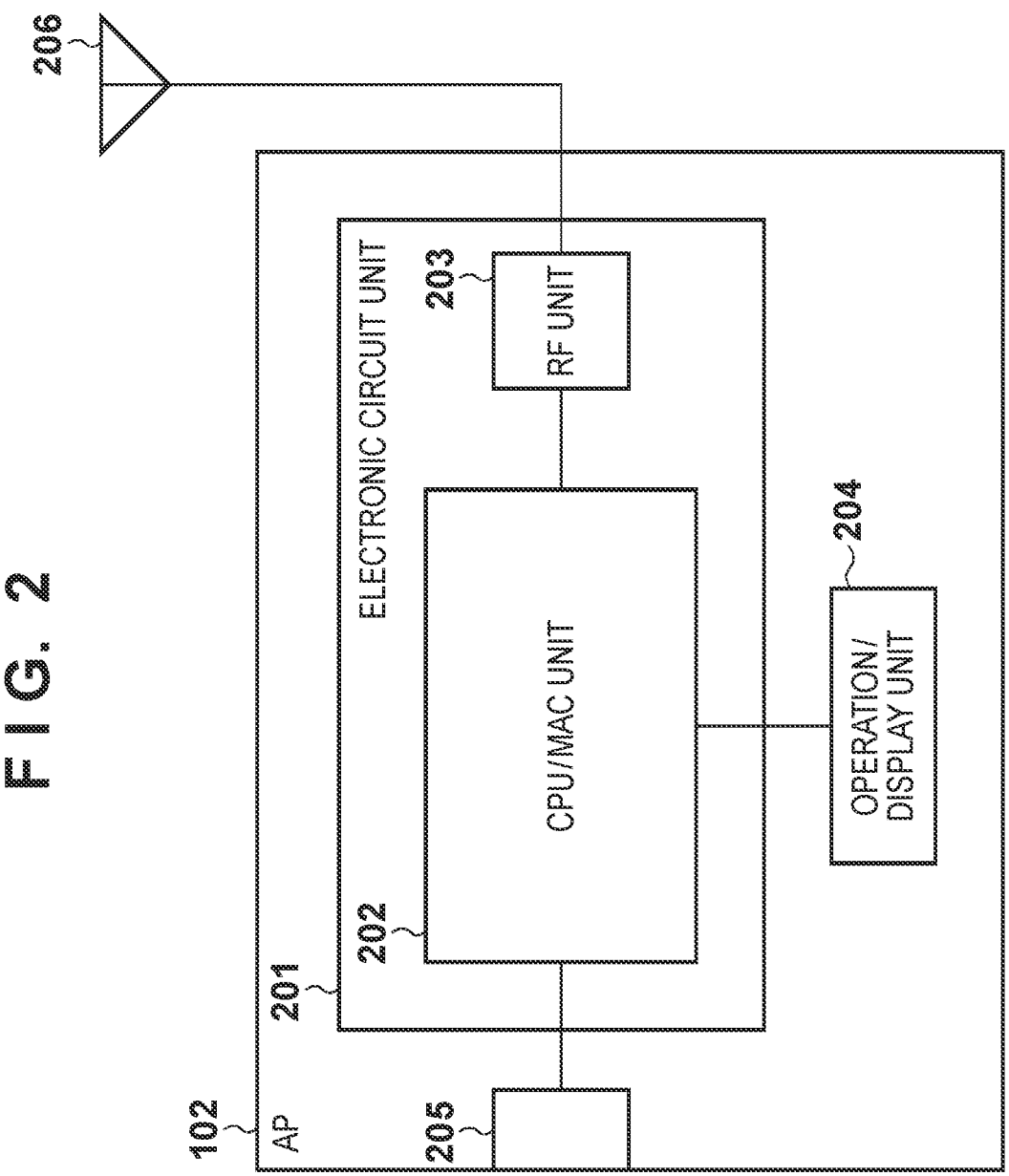
FIG. 2 is a block diagram schematically showing an example of the arrangement of an AP 102 in the printing system 100 according to the embodiment of the present invention.

FIG. 2 is a block diagram schematically showing an example of the arrangement of the AP 102. The AP 102 is a device functioning as a bridge which enables mutual communication between an apparatus (for example, the mobile terminal 101) connected to a wireless communication network and an apparatus connected to a wired network (for example, the wired LAN 106). The AP 102 includes an electronic circuit unit 201, an operation/display unit 204, a wired LAN port 205, and an antenna 206. The wired LAN port 205 includes a connector to which an Ethernet cable for connection to the wired LAN 106 can be connected. The operation/display unit 204 includes, for example, an LED and a switch, and displays the states of the main body of the AP 102, each port, and the like. Note that one end of the Ethernet cable is connected to the wired LAN port 205, and the other end is connected to a network hub (not shown). The mail server 103, the printing server 104, and the printer 105 can be connected to the network hub.

The electronic circuit unit 201 includes a CPU/MAC unit 202 and a radio frequency transceiver unit (to be referred to as an RF (Radio Frequency) unit hereinafter) 203. The CPU/MAC unit 202 incorporates a CPU, a memory, and a MAC (Media Access Control) unit. These devices are connected to each other via a bus in the CPU/MAC unit 202. The MAC unit in the CPU/MAC unit 202 can execute wireless communication via the RF unit 203 and wired communication via the wired LAN port 205, and bridges these communications.

The antenna 206 for transmitting and receiving radio waves having a frequency corresponding to the wireless LAN scheme in use is connected to the RF unit 203. The RF unit 203 converts a radio signal (analog signal) included in the radio waves received by the antenna 206 into a digital signal and outputs it to the CPU/MAC unit 202. The CPU/MAC unit 202 analyzes a destination or path from the digital signal received from the RF unit 203, and transmits the signal onto the wired LAN 106 via the wired LAN port 205. The RF unit 203 converts the digital signal received from the CPU/MAC unit 202 into an analog signal (radio signal) to be transmitted to the antenna 206, and outputs the signal. Note that the AP 102 includes a security function for safe wireless LAN connection.

<Arrangements of Mail Server 103 and Printing Server 104>

Figure 3:
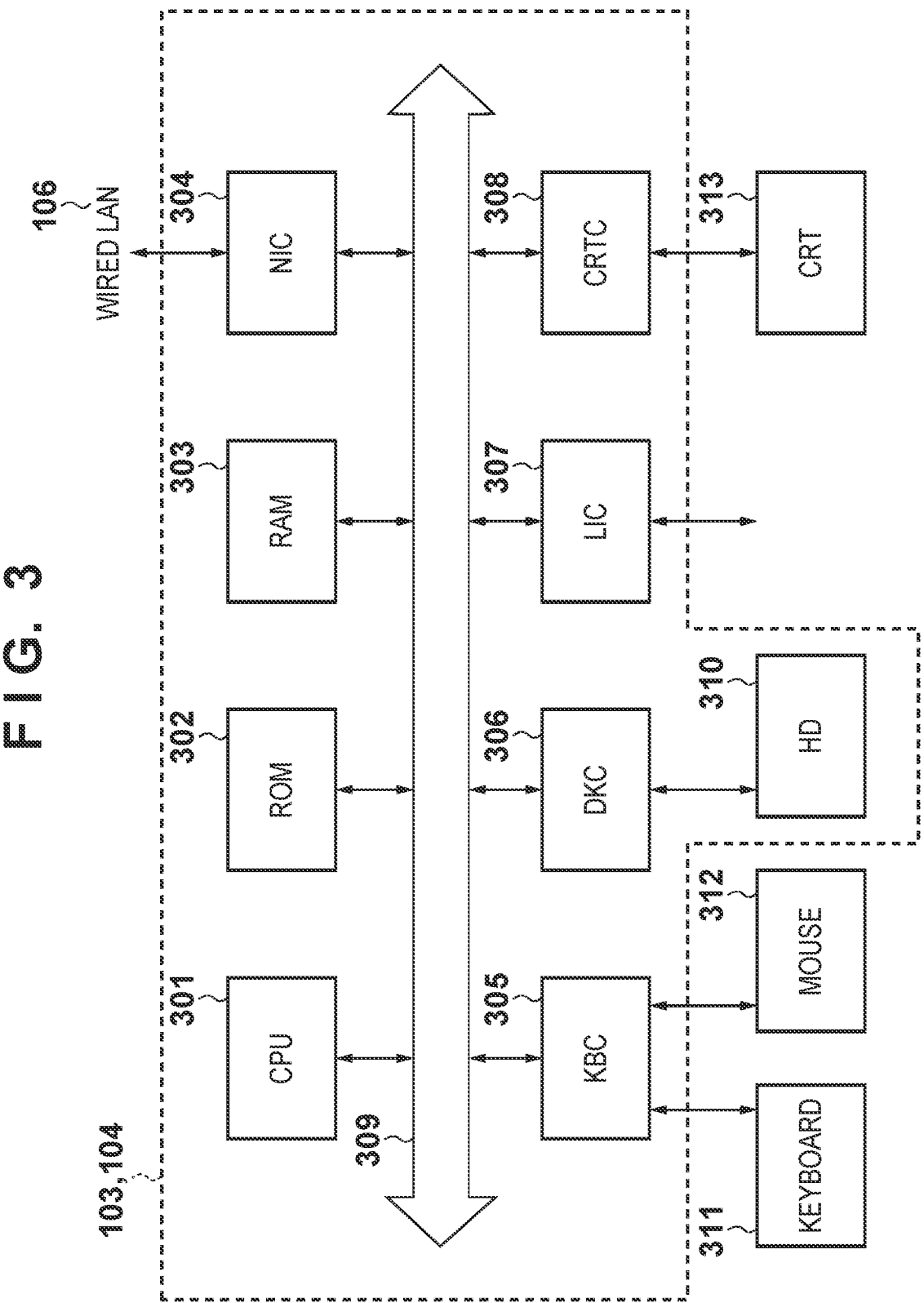
FIG. 3 is a block diagram showing an example of the hardware arrangement of a mail server 103 in the printing system 100 according to the embodiment of the present invention.

FIG. 3 is a block diagram showing an example of the hardware arrangement of the mail server 103. As described above, the mail server 103 is formed as a PC, in which a program for implementing a server function is installed and runs. Note that the printing server 104 also has the same hardware arrangement as that of the mail server 103.

The mail server 103 includes a CPU 301, a ROM 302, a RAM 303, and an NIC (Network Interface Controller) 304. The mail server 103 further includes a KBC (KeyBoard Controller) 305, a DKC (DisK Controller) 306, an LIC (Local Interface Controller) 307, and a CRTC (CRT Controller) 308. These devices are connected to each other via a bus 309 in the mail server 103.

The NIC 304 is connected to the wired LAN 106, and functions as an interface for communication with an external apparatus. A keyboard 311 and a mouse 312 are connected to the KBC 305. An HD (Hard Disk) 310 is connected to the DKC 306. A peripheral device can be connected to the LIC 307 via a local interface such as a USB. A CRT display 313 is connected to the CRTC 308. Note that peripheral devices such as a printer may be connected via the NIC 304 as well as the LIC 307.

The ROM 302 stores programs such as a basic I/O program and an OS. The CPU 301 reads out programs stored in the ROM 302 to the RAM 303 and executes it to implement the function of the OS on the mail server 103. The HD 310 stores application programs running on the OS. The CPU 301 reads out the application programs stored in the HD 310 to the RAM 303 and executes it to implement the functions of the respective application programs on the OS.

In the mail server 103, programs for implementing the functions of the SMTP server and POP server are installed in the HD 310. In the printing server 104, a program (printer driver) for performing print control on the printer 105 and programs such as an application program for analyzing received electronic mail and its attached file are installed in the HD 310. The mail server 103 and the printing server 104 respectively implement server functions by executing these programs installed in the HD 310.

<Arrangement of Printer 105>

Figure 4:
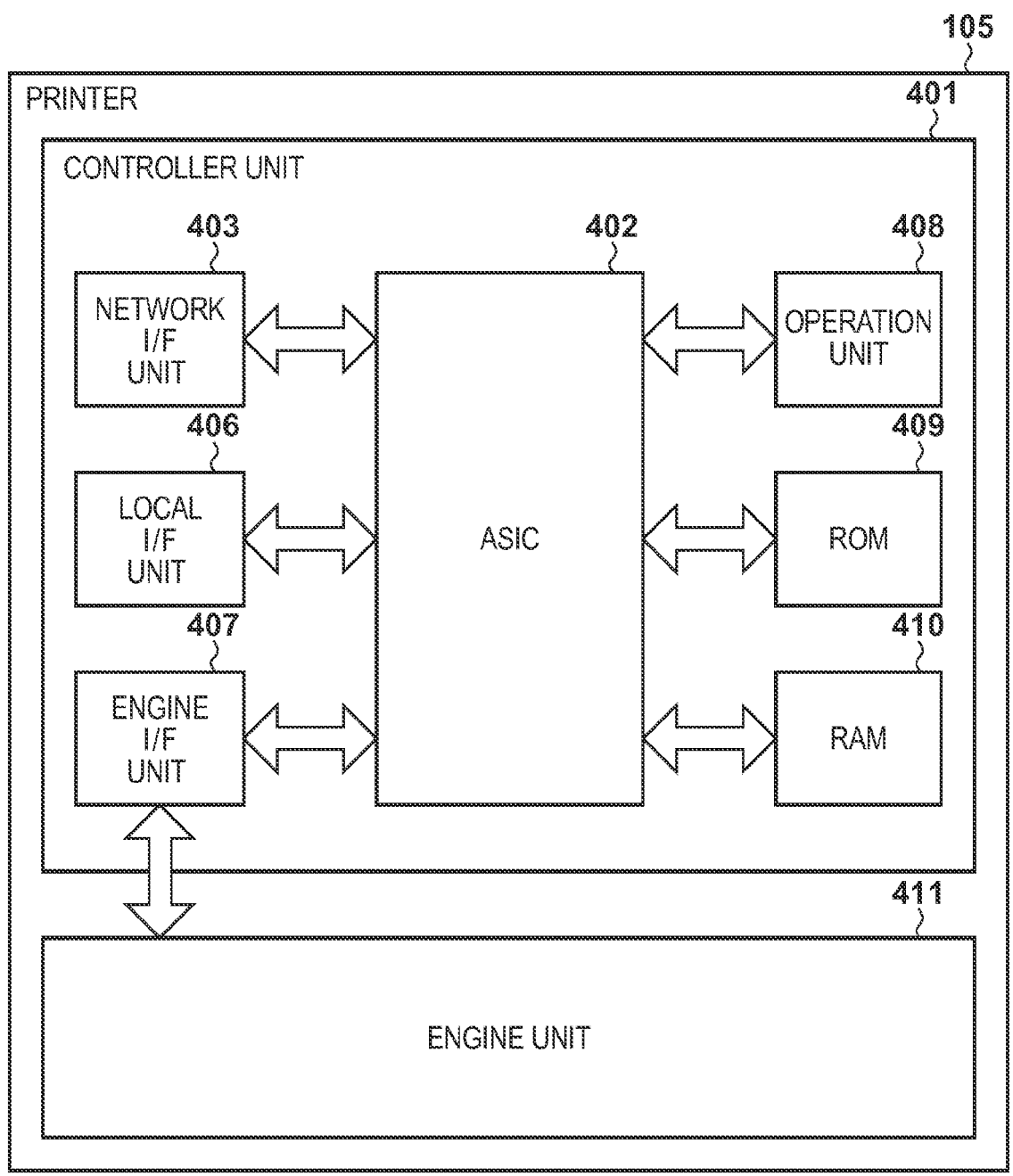
FIG. 4 is a block diagram schematically showing an example of the arrangement of a printer 105 in the printing system 100 according to the embodiment of the present invention.

FIG. 4 is a block diagram schematically showing an example of the arrangement of the printer 105. The printer 105 roughly includes a controller unit 401 and an engine unit 411. The controller unit 401 includes an ASIC 402, a network I/F (interface) unit 403, a local I/F unit, an engine I/F unit 407, an operation unit 408, a ROM 409, and a RAM 410. The controller unit 401 processes received print data via the network I/F (interface) unit 403 or a local I/F unit 406.

The ASIC 402 incorporates a CPU and mainly sends print data to the engine unit 411 to make the engine unit 411 execute printing based on the print data. The operation unit 408 simply notifies the user of the operation state of the printer by blinking the LED. Note that the operation unit 408 cannot display the detailed operation state of the printer 105, and does not include any input interface for allowing the user to issue a detailed operation instruction to the printer 105. The ROM 409 stores a program necessary for the operation of the printer 105. The RAM 410 is used as an image rendering area when the ASIC 402 (CPU) processes print data or a work area for a program.

The network I/F unit 403 functions as an interface for transmitting and receiving data to and from the printing server 104 and external apparatuses such as another PC via a network. The local I/F unit 406 functions as an interface for transmitting and receiving data to and from the PC connected via a local interface such as a USB. The engine I/F unit 407 functions as an interface for transmitting the print data processed by the ASIC 402 to the engine unit 411. The engine unit 411 prints an image based on the print data received from the controller unit 401 on a sheet.

<Electronic Mail Transmitting/Receiving Operation in Printing System 100>

Figure 5:
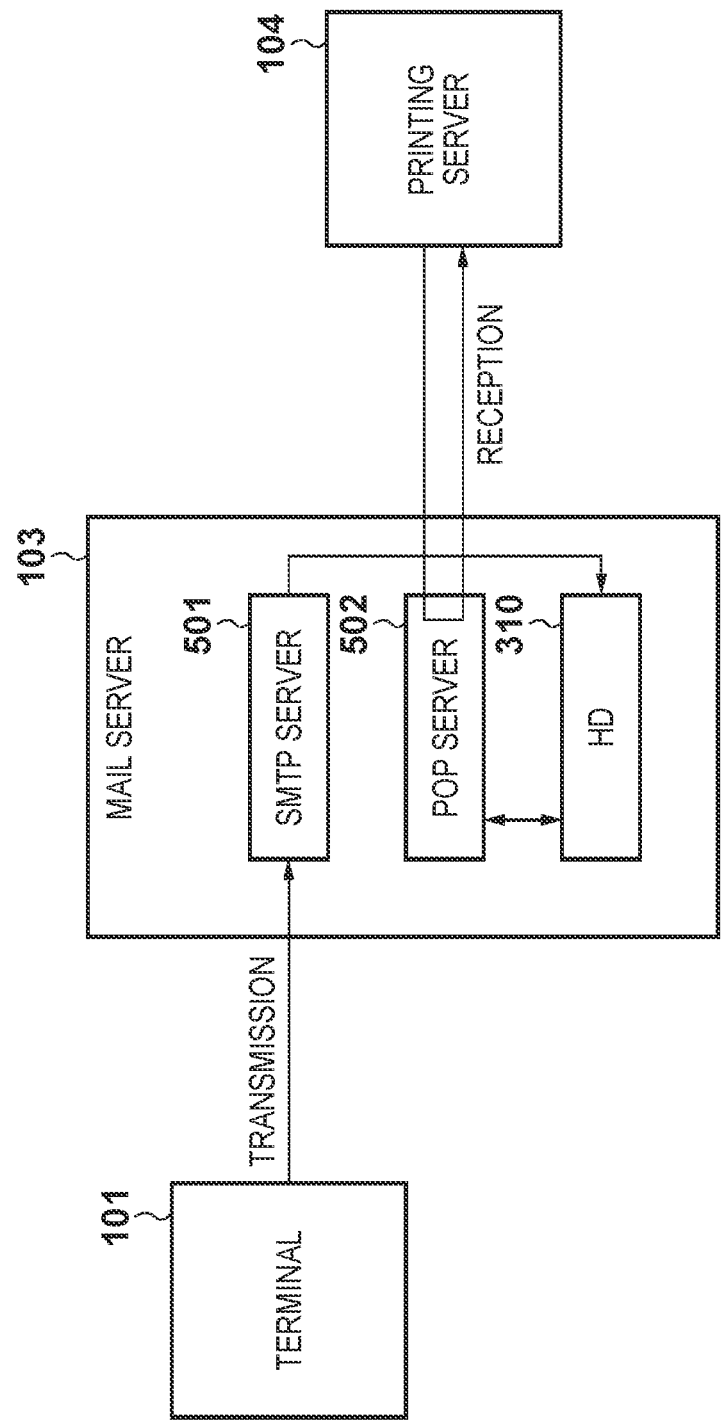
FIG. 5 is a view schematically showing a transmitting/receiving operation procedure for electronic mail in the printing system 100 according to the embodiment of the present invention.

FIG. 5 is a view schematically showing a procedure for electronic mail transmitting/receiving operation in the printing system 100. The mobile terminal 101 uses electronic mail software to transmit electronic mail for making the printer 105 execute printing to an electronic mail address (electronic mail address corresponding to the mail server 103), as a destination, at which the printing server 104 can receive the mail. The electronic mail software in the mobile terminal 101 designates a predetermined electronic mail address corresponding to the printer 105, for example, USER@mailprint.xx.jp as a destination address. Assume that in this embodiment, the mail server 103 receives electronic mail corresponding to the domain included in this electronic mail address. The printing server 104 can receive the electronic mail received by the mail server 103 from the mail server 103 in accordance with POP. The mail server 103 receives the above electronic mail transmitted from the mobile terminal 101 via the AP 102 and the wired LAN 106. An SMTP server 501 operating on the mail server 103 receives electronic mail from the mobile terminal 101 in accordance with SMTP and stores the mail in the HD 310.

The printing server 104 receives electronic mail stored in the mail server 103 in accordance with POP. A print application running on the printing server 104 checks the presence/absence of electronic mail received by the mail server 103 with respect to a POP server 502 operating on the mail server 103. The print application checks, with respect to the POP server 502, whether electronic mail addressed to an electronic mail address corresponding to the mail server 103 (printing server 104) has been received. The print application executes such check processing at predetermined intervals.

The POP server 502 requests for a user name and a password in response to access from the printing server 104. Upon succeeding in authentication based on the user name and the password notified from the printing server 104, the POP server 502 checks the electronic mail stored in the HD 310 and transmits information indicating the presence/absence of electronic mail corresponding to the printing server 104 to the printing server 104. Upon receiving electronic mail corresponding to the printing server 104 and storing it in the HD 310, the POP server 502 transmits the electronic mail to the printing server 104.

<Printing Operation Based on Electronic Mail in Printing System 100>

Figure 6:
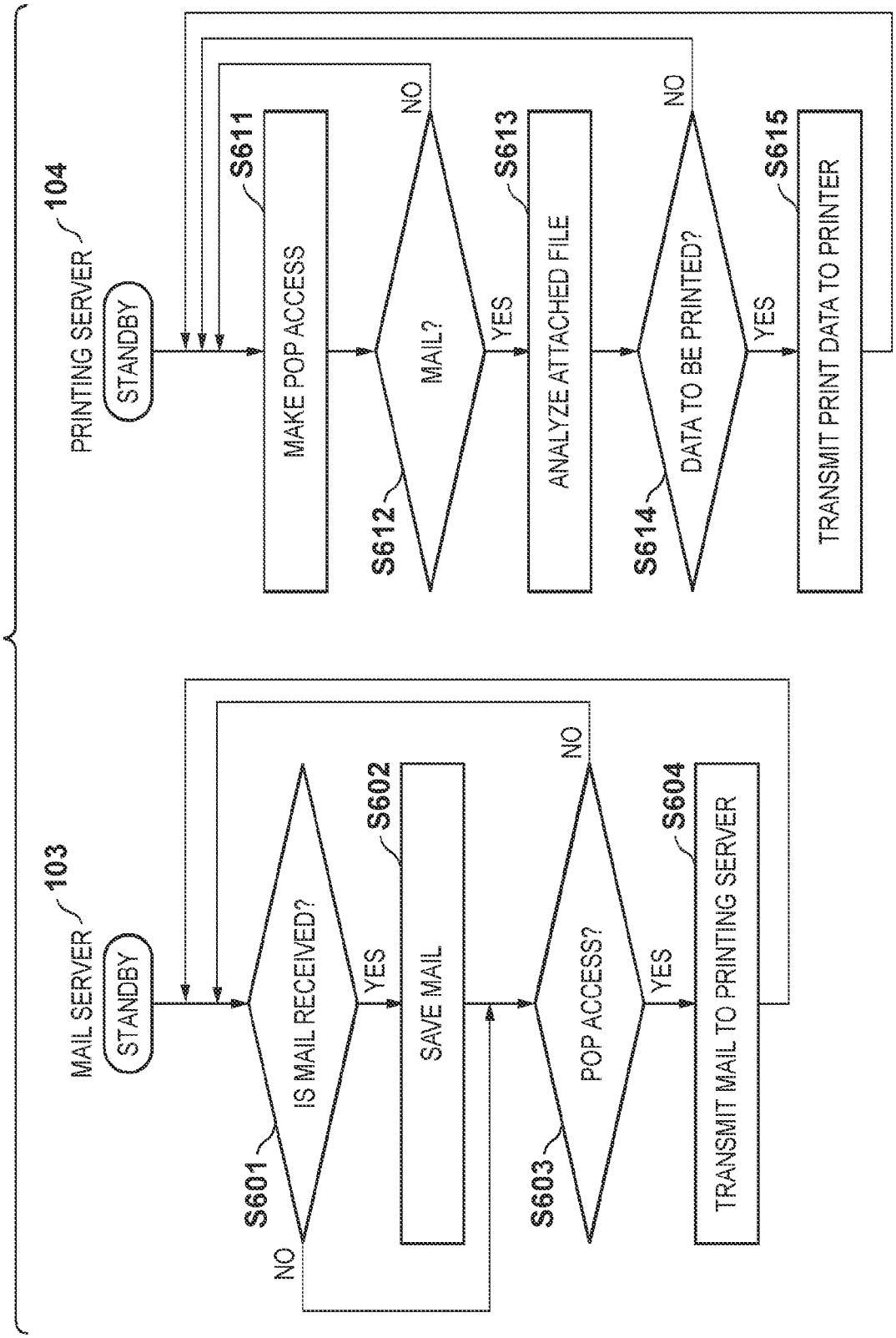
FIG. 6 is a flowchart showing the operation procedures of the mail server 103 and a printing server 104 according to the embodiment of the present invention.

FIG. 6 is a flowchart showing the operation procedures of the mail server 103 and the printing server 104 in the printing system 100. Printing operation based on electronic mail in the printing system 100 will be described with reference to FIG. 6.

In the printing system 100, the electronic mail software in the mobile terminal 101 transmits electronic mail in which a printer to execute printing is designated, upon attaching a print target file to the mail. The mobile terminal 101 displays the transmission screen of the electronic mail software. The user then attaches a print target file and designates a printer to execute printing via the transmission screen. On the transmission screen, for example, the user inputs USER@mailprint.xx.jp to an address field
and

LBP100 to a subject field. This electronic mail address is an address corresponding to the mail server 103 (printing server 104). As described above, the user inputs the name of a printer to execute printing to the address field of the electronic mail attached with the print target file. Note that the user may input the name of the printer to the text of the electronic mail instead of the subject field. In this manner, the user writes information indicating a printer to execute printing a print target file on the subject field or text of electronic mail. The name of a printer is an example of an identifier for specifying the printer. It is therefore possible to use information other than the name of a printer such as an IP address as long as it can specify the printer. In this case, the table shown in FIG. 9 (to be described later) manages information such as IP addresses in association with printer drivers.

The AP 102 receives the above electronic mail transmitted from the mobile terminal 101 by wireless communication. The AP 102 transmits the received electronic mail to the mail server 103 designated as the designation of the mail via the wired LAN 106. Upon receiving the electronic mail in accordance with SMTP (step S601), the mail server 103 stores the received electronic mail in the HD 310 together with the attached file (step S602).

The printing server 104 makes an inquiry about the presence/absence of electronic mail by performing POP access to the mail server 103 at predetermined intervals (for example, constant intervals) as described above (step S611). In response to the POP access from the printing server 104 (step S603), the mail server 103 transmits, if electronic mail is stored in the HD 310, the electronic mail and its attached file to the printing server 104 (step S604). Upon receiving the electronic mail from the mail server 103 (step S612), the printing server 104 analyzes the file attached to the electronic mail (step S613).

If the analysis result in step S613 indicates that the file attached to the received electronic mail is print target data (step S614), the printing server 104 generates print data from the attached file. In addition, the printing server 104 transmits the generated print data to the printer designated in the received electronic mail (the printer 105 in this case) (step S615). Note that in this embodiment, a file before analysis by the printing server 104 in step S613 will be referred to as an "attached file", and the data rendered from the attached file so as to be printable by a printer to execute printing will be referred to as "print data".

Finally, the printer 105 forms an image based on the print data on a sheet by printing the print data received from the printing server 104.

<Print Control on Printing Server 104>

Figure 7:
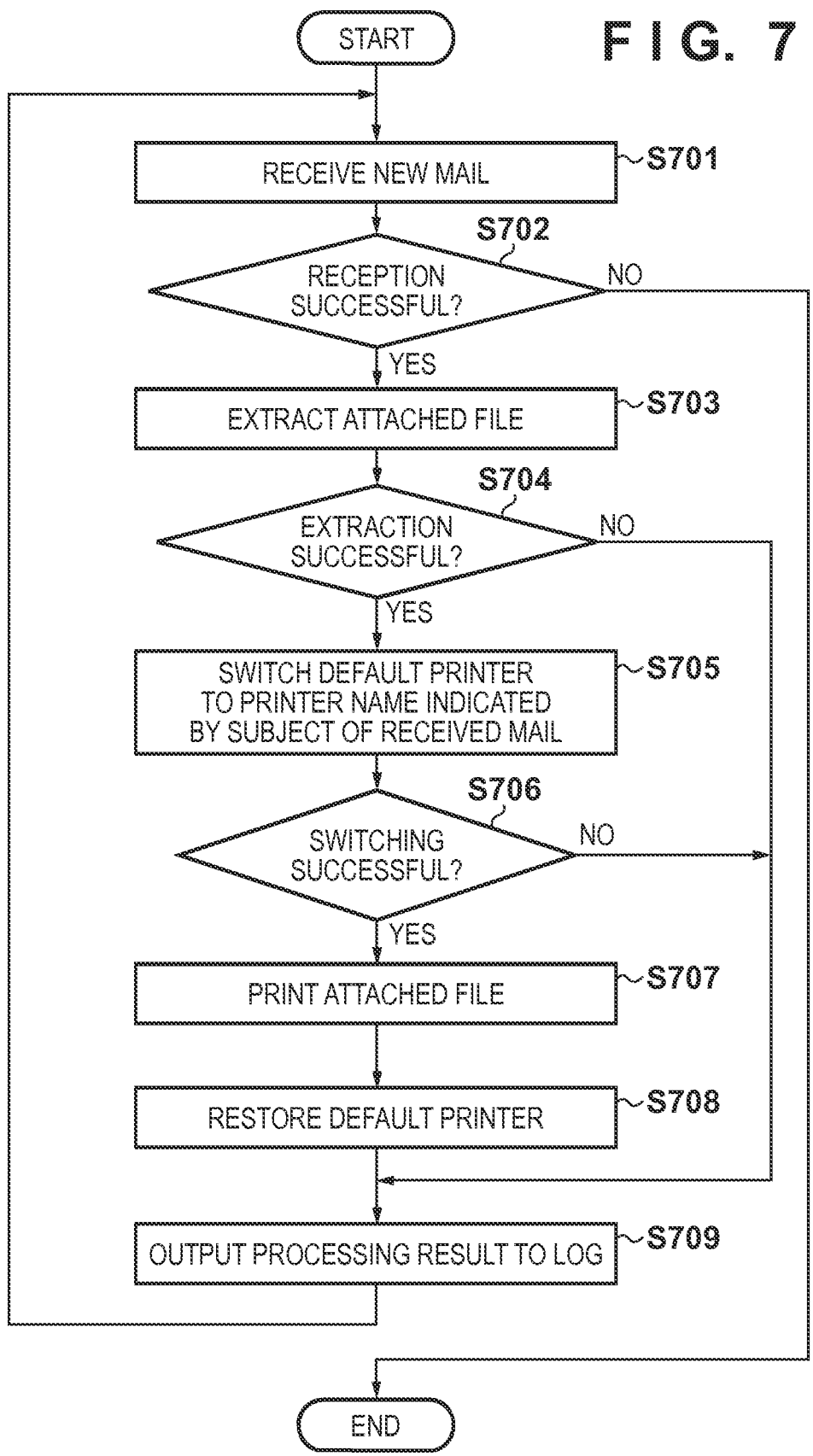
FIG. 7 is a flowchart showing a procedure for print control on the printer 105 which is executed by the printing server 104 according to the embodiment of the present invention.

FIG. 7 is a flowchart showing a procedure for print control on the printer 105 which is executed by the printing server 104. The CPU 301 of the printing server 104 executes the processing in each step shown in FIG. 7.

First of all, in step S701, the CPU 301 receives electronic mail from the mail server 103. This electronic mail is transmitted from the mobile terminal 101, to which a print target file is attached and in which the printer 105 is designated as a printer to execute printing for the attached file. In step S702, the CPU 301 determines whether electronic mail from the mail server 103 has been successfully received. If YES, the process advances to step S703. If NO, the CPU 301 terminates the processing.

In step S703, the CPU 301 extracts the file attached to the received electronic mail. In step S704, the CPU 301 further determines whether the extraction in step S703 has succeeded. If YES, the CPU 301 stores the extracted file in the HD 310. If NO, the process advances to step S709 to output the processing result to the log. Note that the CPU 301 displays this log on the CRT display 313 and stores it in the HD 310. This allows the user to use the log for troubleshooting.

In step S705, the CPU 301 switches the default printer setting to "printer name" written in the subject field (or text) of the received electronic mail. Assume that in this embodiment, the name of the printer 105 is written as the printer name, and the printer 105 is designated as a printer to print the attached file. In step S706, the CPU 301 further determines whether the switching operation has succeeded. If YES, the process advances to step S707. If NO, the process advances to step S709. In step S709, the CPU 301 outputs the processing result to the log as in the above case.

In step S707, the CPU 301 causes the printer 105 designated in the electronic mail to print the attached file extracted from the received electronic mail. In this case, the CPU 301 checks the extension of the attached file and activates an application, stored in the HD 310, which corresponds to the file. The CPU 301 activates an application corresponding to the extension of the attached file by referring to a table 800 shown in FIG. 8, which associates the extensions of the files attached to electronic mails with applications for processing the files. The CPU 301 causes the printer 105 to print the attached file by using the printing function of the activated application.

In addition, the CPU 301 activates the printer driver linked to the name of the printer designated as a printer to execute printing, which is obtained in step S705. The CPU 301 generates print data by analyzing the attached file extracted from the received electronic mail and rendering the file into print data printable by the printer 105 using the activated printer driver. Thereafter, the CPU 301 performs the print control of transmitting the generated print data to the designated printer 105 to cause the printer 105 to execute printing based on the print data.

The printing server 104 holds print settings in the HD 310 in advance for each printer including the printer 105 as a control target via a network (the wired LAN 106). In step S707, when performing print control on the printer 105, the CPU 301 causes the printer (the printer 105 in this case) designated in the electronic mail to execute printing in accordance with print settings, of the print settings held in the HD 310, which correspond to the printer.

In step S707, the CPU 301 can decide a printer driver to be activated by using a table 900 shown in, for example, FIG. 9 as a table associating printer drivers with printer names. Every time a new printer is connected to the wired LAN 106 or the local I/F unit 406 of the printing server 104, the CPU 301 adds information indicating a printer driver for the printer and the printer name to the table 900.

Upon completion of printing of the attached file, the CPU 301 restores the default printer settings in step S708, and outputs the processing result to the log in step S709. The process then returns to step S701.

<Electronic Mail Address Registration Processing in Printing Server 104>

FIG. 10 is a flowchart showing a procedure for electronic mail address registration processing which is executed in the printing server 104 in response to the reception of electronic mail from the mobile terminal 101 via the mail server 103 (steps S701 and S702). The CPU 301 of the printing server 104 executes the processing in each step in FIG. 10. Note that the CPU 301 can execute the registration processing shown in FIG. 10 at an arbitrary timing after the reception of the electronic mail from the mobile terminal 101. For example, the CPU 301 may execute registration processing either after print processing (that is, after step S708) for the file attached to electronic mail from the mobile terminal 101 or currently with print processing. Alternatively, the CPU 301 may execute registration processing before print processing.

Step S1001 corresponds to steps S701 and S702. The CPU 301 determines whether it has received electronic mail from the mail server 103, and repeats the determination until it receives electronic mail. When the CPU 301 receives electronic mail from the mail server 103, the process advances to step S1002.

In step S1002, the CPU 301 determines whether the electronic mail address of the transmission source of the received electronic mail is registered in a list as shown in FIG. 11, which associates electronic mail addresses with printer names. More specifically, the CPU 301 determines whether the electronic mail address of the transmission source is registered in the list (FIG. 11) saved in the HD 310 in association with the printer (the printer 105 in this case) designated in the received electronic mail. A list 1100 shown in FIG. 11 is an example of a list in which printer names and electronic mail addresses are registered in association with each other.

If the CPU 301 determines in step S1002 that the electronic mail address associated with the designated printer 105 is not registered in the list 1100, the process advances to step S1003. In step S1003, the CPU 301 registers (saves) the electronic mail address of the transmission source in the list 1100 in association with the designated printer 105. In contrast to this, if the address has already been saved in association with the printer, the CPU 301 returns the process to step S1001.

<Notification Processing Associated with Printer Driver in Printing Server 104>

FIG. 12 is a flowchart showing a procedure for notifying the mobile terminal 101 of information indicating a change in the installation state of a printer driver in the printing server 104. The CPU 301 of the printing server 104 executes the processing in each step shown in FIG. 12.

The CPU 301 determines in steps S1201, S1211, and S1221 whether the installation state of a printer driver in the printing server 104 has changed. If the CPU 301 determines in one of these steps that the installation state of the printer driver has changed, the CPU 301 executes the following processing. That is, the CPU 301 notifies a mobile terminal corresponding to the electronic mail address of information indicating the change in installation state by using the electronic mail address saved in association with any printer in the list 1100 (FIG. 11).

(Installation of New Printer Driver)

In step S1201, the CPU 301 determines whether there is any printer to be newly added on the wired LAN 106 (that is, whether a new print driver corresponding to the printer should be installed). If the CPU 301 determines in step S1201 that there is no printer to be newly added, the process advances to step S1211. If the CPU 301 determines that there is a print driver to be newly added, the process advances to step S1202.

In step S1202, the CPU 301 determines whether the installation of a printer driver corresponding to the printer to be added has been completed. If YES, the process advances to step S1203. In step S1203, the CPU 301 determines whether an electronic mail address is registered (saved) in the list 1100 (FIG. 11). If no electronic mail address is registered, the process returns to step S1201. In contrast to this, if the CPU 301 determines that at least one electronic mail address is registered, the process advances to step S1204. In step S1204, the CPU 301 transmits, by using all the electronic mail addresses registered in the list 1100, information indicating the added printer name corresponding to the newly installed printer driver to all the corresponding mobile terminals. With this operation, the CPU 301 notifies these mobile terminals of the printer name.

As described above, when a printer driver corresponding to a new printer is installed in the printing server 104, a mobile terminal can cause the new printer to print electronic mail and its attached file based on the printer driver.

(Change in Setting Associated with Printer Driver)

The CPU 301 executes the following processing when the setting of any of printer drivers installed in the printing server 104 changes. That is, by using all the electronic mail addresses saved in the list 1100 in association with the printers corresponding to the printer drivers, the CPU 301 notifies all the corresponding mobile terminals of information indicating the changed setting. The processing in steps S1211 to S1214 will exemplify a case in which a printer name is changed as an example of a change in setting of a printer driver.

In step S1211, the CPU 301 determines whether to change a printer name corresponding to any of the registered printer drivers. If the CPU 301 determines in step S1211 that it changes no printer name, the process advances to step S1221. If the CPU 301 determines that it changes a printer name, the process advances to step S1212.

In step S1212, the CPU 301 determines whether the change of the printer name has been completed. If YES, the process advances to step S1213. In step S1213, the CPU 301 determines whether the list 1100 includes an electronic mail address which is registered in association with the printer whose name has been changed. If the CPU 301 determines in step S1213 that the list 1100 includes no such electronic mail address, the process returns to step S1201. If the list 1100 includes such an electronic mail address, the process advances to step S1214.

In step S1214, by using all the electronic mail addresses registered in association with the printer whose name has been changed, the CPU 301 transmits the printer name after the change to all the corresponding mobile terminals. With this operation, the CPU 301 notifies these mobile terminals of the printer name.

As described above, even if the setting of any of the printer drivers installed in the printing server 104 is changed, it is possible to properly issue an instruction to print electronic mail and its attached file to the printing server 104 based on the printer driver after the change.

(Uninstallation of Printer Driver)

In step S1221, the CPU 301 determines whether to delete (uninstall) any of the printer drivers installed in the printing server 104. If the CPU 301 determines in step S1221 that there is no printer driver which should be deleted, the process returns to step S1201. If the CPU 301 determines that there is such a printer driver, the process advances to step S1222.

In step S1222, the CPU 301 determines whether the deletion of the printer driver has been completed. If YES, the process advances to step S1223. In step S1223, the CPU 301 determines whether the list 1100 includes any electronic mail address associated with the printer corresponding to the deleted printer driver. If NO, the process returns to step S1201. If YES, the process advances to step S1224.

In step S1224, the CPU 301 determines whether the electronic mail address registered in the list 1100 is associated with only the printer corresponding to the deleted printer driver. If the CPU 301 determines that the address is associated with only the printer corresponding to the deleted printer driver, the process advances to step S1225. If the CPU 301 determines that the address is also associated with a printer other than the printer corresponding to the deleted printer driver, the process advances to step S1226.

In step S1225, the CPU 301 performs transmission (notification), to a mobile terminal corresponding to an electronic mail address associated with the deleted printer driver, of a list of printer names corresponding to printer drivers other than the deleted printer driver, which is installed in the printing server 104 (registered in the list 1100), by using the electronic mail address associated with the deleted printer driver. This allows the mobile terminal which has received the notification to instruct the printing server 104 to print the electronic mail and its attached file based on a printer driver other than the deleted printer driver.

In step S1226, the CPU 301 executes the following processing when an electronic mail address associated with a printer corresponding to the deleted printer driver is also associated with a printer other than the above printer (printing apparatus). That is, the CPU 301 notifies the mobile terminals corresponding to these electronic mail addresses of the printer name corresponding to the deleted printer driver by using these electronic mail addresses. This can prevent the mobile terminal which has received the notification from erroneously issuing an instruction to print the electronic mail and its attached file to the printer corresponding to the deleted printer driver.

Note that changes in the installation state of a printer driver in a printing server are not limited to these cases, and may be others.

Alternatively, the user of a mobile terminal may be allowed to designate and register, in a printing server in advance, specific changes in installation state which should be notified to a mobile terminal. In this case, the printing server registers conditions for notification in the list 1100 together with electronic mail addresses.

As has been described above, according to this embodiment, the printing server 104 generates print data from a print target file which is attached to the electronic mail received from the mobile terminal 101 via a network, and causes the printer designated in the electronic mail to execute printing based on the print data. Upon receiving such electronic mail, the printing server 104 saves the electronic mail address of the transmission source of the electronic mail in association with the designated printer. In addition, when the installation state of a printer driver changes, the printing server 104 notifies a mobile terminal of information indicating the change by using the electronic mail address saved in association with any of printers.

According to this embodiment, when the installation state of a printer driver changes, the printing server 104, which causes a printer to execute printing based on the electronic mail received from a mobile terminal, can notify a proper mobile terminal of information indicating the change. Consequently, even if the installation state of a printer driver changes in the printing server 104, it is possible to prompt a mobile terminal using the printing server 104 to issue an instruction to print electronic mail and its attached file to a proper printer.

Although not shown in FIG. 1, the mobile terminal 101 and the AP 102 may perform wireless communication based on a cellular phone scheme instead of a wireless LAN scheme. In addition, the number of files to be attached to electronic mail by the mobile terminal 101 may be one or two or more.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-077802, filed Mar. 29, 2012, which is hereby incorporated by reference herein in its entirety.

What is claimed is:

1. An information processing apparatus in which print drivers respectively corresponding to not less than one printing apparatus configured to communicate via a network are installed, the apparatus comprising:

a reception unit configured to receive, from a mobile terminal, electronic mail to which a print target file is attached and in which a printing apparatus to print the file is designated;

a print control unit configured to cause a printing apparatus designated in the electronic mail received by the reception unit to execute printing based on the print target file attached to the electronic mail by using a print driver corresponding to the designated printing apparatus;

a saving unit configured to save an electronic mail address of a transmission source of electronic mail received by the reception unit; and a notification unit configured to, when any of print drivers installed in the information processing apparatus is deleted, notify, if an electronic mail address saved by the saving unit is associated with only a printing apparatus corresponding to the deleted print driver, a mobile terminal corresponding to the electronic mail address of a list of names of printing apparatuses corresponding to other print drivers than the deleted print driver installed in the information processing apparatus by using the electronic mail address, and notify, if an electronic mail address saved by the saving unit is associated with a printing apparatus other than the printing apparatus corresponding to the deleted print driver, a mobile terminal corresponding to the electronic mail address of a name of a printing apparatus corresponding to the deleted print driver by the electronic mail address.

2. The apparatus according to claim 1, wherein when a new print driver is installed in the information processing apparatus, the notification unit notifies, by using all electronic mail addresses saved by the saving unit, all corresponding mobile terminals of a name of a printing apparatus corresponding to the new print driver.

3. The apparatus according to claim 1, wherein the saving unit saves an electronic mail address of a transmission source of electronic mail received by the reception unit in association with the designated printing apparatus.

4. The apparatus according to claim 3, wherein when a setting of one of print drivers installed in the information processing apparatus changes, the notification unit notifies, by using all electronic mail addresses saved by the saving unit in association with a printing apparatus corresponding to the one of print drivers, all corresponding mobile terminals of information indicating the changed setting.

5. The apparatus according to claim 4, wherein when a name of a printing apparatus corresponding to a print driver, of settings of the print driver installed in the information processing apparatus, changes, the notification unit notifies, by using all electronic mail addresses saved by the saving unit in association with the printing apparatus, all corresponding mobile terminals of a name after the change.

6. A method of controlling an information processing apparatus in which print drivers respectively corresponding to not less than one printing apparatus configured to communicate via a network are installed, the method comprising:

receiving, from a mobile terminal, electronic mail to which a print target file is attached and in which a printing apparatus to print the file is designated;

causing a printing apparatus designated in the electronic mail received in the receiving step to execute printing based on the print target file attached to the electronic mail by using a print driver corresponding to the designated printing apparatus;

saving an electronic mail address of a transmission source of electronic mail received in the receiving; and when any of print drivers installed in the information processing apparatus is deleted, notifying, if an electronic mail address saved in the saving step is associated with only a printing apparatus corresponding to the deleted print driver, a mobile terminal corresponding to the electronic mail address of a list of names of printing apparatuses corresponding to other print drivers than the deleted print driver installed in the information processing apparatus by using the electronic mail address, and notifying, if an electronic mail address saved in the saving step is associated with a printing apparatus other than the printing apparatus corresponding to the deleted print driver, a mobile terminal corresponding to the electronic mail address of a name of a printing apparatus corresponding to the deleted print driver by using the electronic mail address.

7. A non-transitory computer-readable storage medium storing a computer program for causing a computer to execute steps of the method of controlling the information processing apparatus according to claim 6.

\* \* \* \* \*